US011722882B2

(12) United States Patent
Luo et al.

(10) Patent No.: US 11,722,882 B2
(45) Date of Patent: Aug. 8, 2023

(54) SIDELINK CAPABILITY SIGNALING AND CONFIGURATION

(71) Applicant: QUALCOMM Incorporated, San Diego, CA (US)

(72) Inventors: Tao Luo, San Diego, CA (US); Sony Akkarakaran, Poway, CA (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 16/900,405

(22) Filed: Jun. 12, 2020

(65) Prior Publication Data

US 2020/0396599 A1 Dec. 17, 2020

Related U.S. Application Data

(60) Provisional application No. 62/861,820, filed on Jun. 14, 2019.

(51) Int. Cl.
*H04W 8/24* (2009.01)
*H04L 5/16* (2006.01)
(Continued)

(52) U.S. Cl.
CPC .............. *H04W 8/24* (2013.01); *H04L 5/16* (2013.01); *H04W 72/23* (2023.01); *H04W 76/27* (2018.02); *H04W 80/02* (2013.01); *H04W 92/18* (2013.01)

(58) Field of Classification Search
CPC ..... H04W 8/24; H04W 72/042; H04W 76/27; H04W 80/02; H04W 92/18; H04W 4/46;
(Continued)

(56) References Cited

U.S. PATENT DOCUMENTS 8,428,079 B1 * 4/2013 Lambert ............... H04W 8/005
370/254
2017/0048647 A1 * 2/2017 Jung ....................... H04W 4/70
(Continued)

FOREIGN PATENT DOCUMENTS

EP 3179778 A1 * 6/2017 ............ H04W 4/023
EP 3179778 A1 6/2017
(Continued)

OTHER PUBLICATIONS

International Search Report and Written Opinion—PCT/US2020/037643—ISA/EPO—dated Aug. 18, 2020.

*Primary Examiner* — Shailendra Kumar
(74) *Attorney, Agent, or Firm* — ArentFox Schiff LLP

(57) ABSTRACT

In an aspect, the present disclosure includes a method, apparatus, and computer readable medium for wireless communications for transmitting, by a user equipment (UE), a capability indication message to a network entity, the capability indication message comprising a sidelink capability for direct communication between the UE and one or more secondary UEs; receiving, at the UE, a configuration message from the network entity in response to the capability indication message, wherein the configuration message includes one or more configuration parameters based on the sidelink capability; and establishing a communication link based on the one or more configuration parameters.

30 Claims, 9 Drawing Sheets

(51) Int. Cl.
*H04W 80/02* (2009.01)
*H04W 76/27* (2018.01)
*H04W 72/23* (2023.01)
*H04W 92/18* (2009.01)

(58) Field of Classification Search
CPC ..... H04W 88/06; H04W 76/14; H04W 8/005; H04L 5/16
See application file for complete search history.

(56) References Cited

U.S. PATENT DOCUMENTS

2017/0230815 A1* 8/2017 Yasukawa ............. H04W 52/02
2021/0337544 A1* 10/2021 Wang ..................... H04W 4/06

FOREIGN PATENT DOCUMENTS

WO         2017088906 A1    6/2017
WO    WO-2017088906 A1 * 6/2017 ........... H04L 5/0053

* cited by examiner

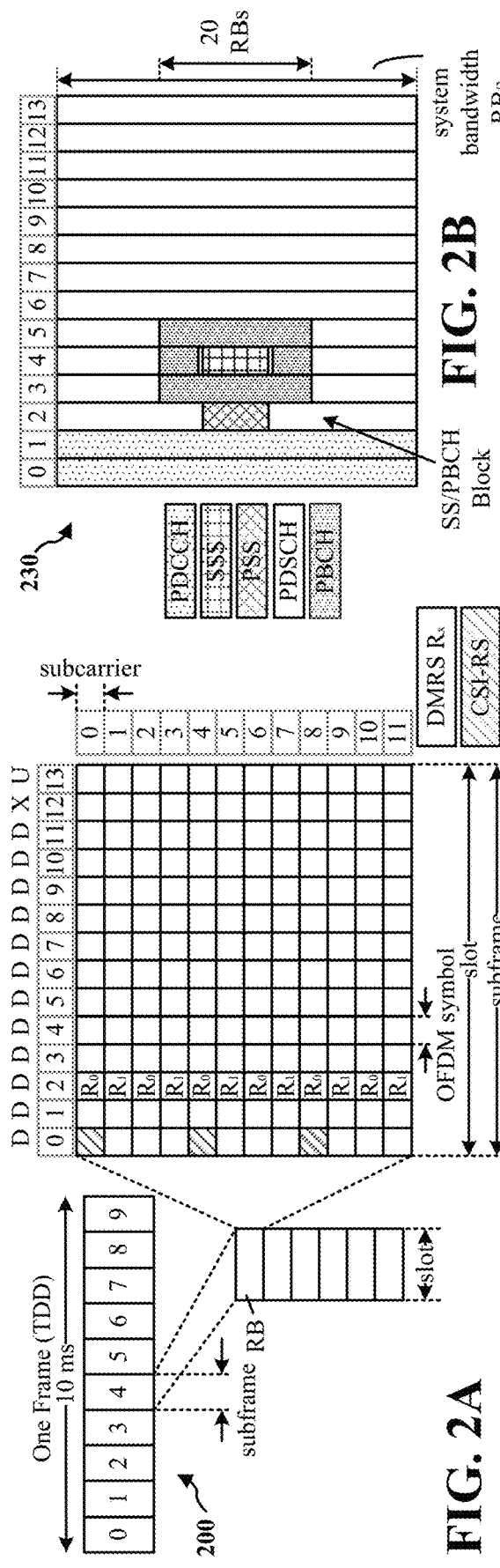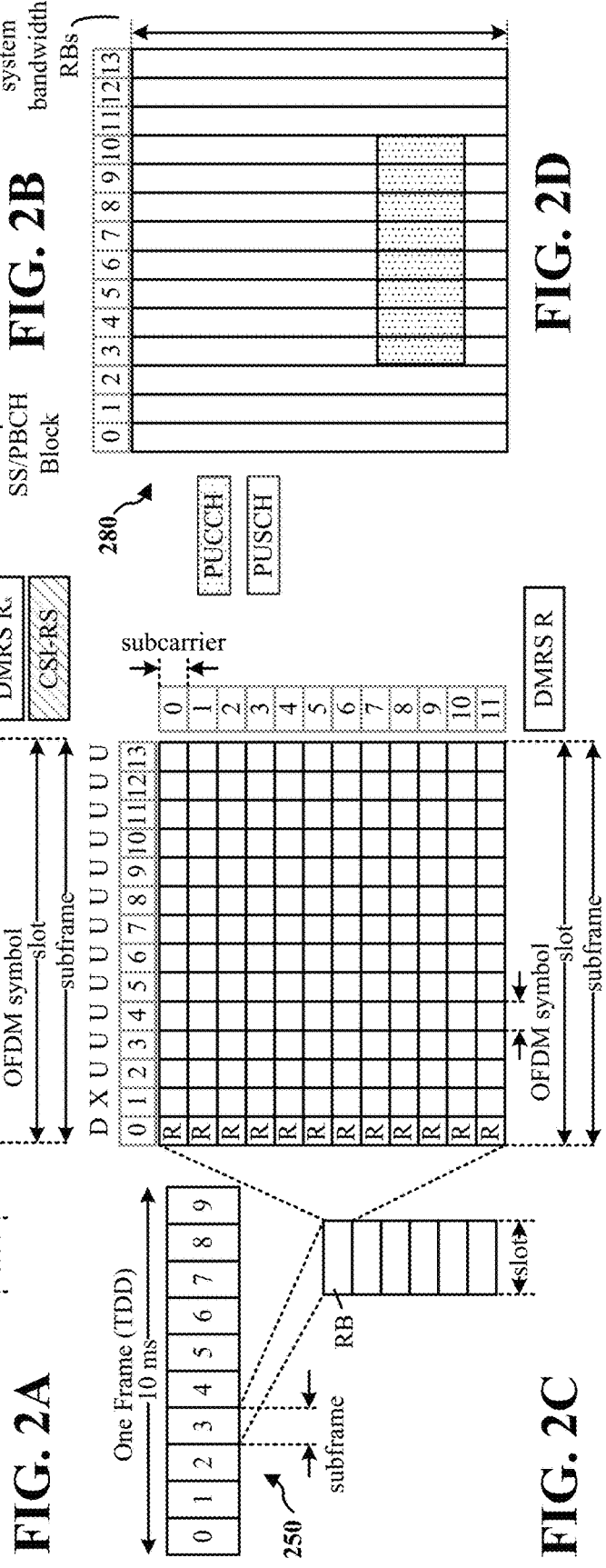

SIDELINK CAPABILITY SIGNALING AND CONFIGURATION

CROSS-REFERENCE TO RELATED APPLICATION(S)

The present application claims benefit of U.S. Provisional Application No. 62/861,820 entitled "SIDELINK CAPABILITY SIGNALING AND CONFIGURATION" filed Jun. 14, 2019, and is assigned to the assignee hereof and hereby expressly incorporated by reference herein.

BACKGROUND

Technical Field

The present disclosure relates generally to communication systems, and more particularly, to communicating sidelink capability information for a user equipment (UE).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. In such systems, the synchronization mechanism (e.g., timing and/or frequency synchronization) for a user equipment (UE) may be based on a connection to a global navigation satellite system (GNSS) or a cellular base station. Alternatively, in absence of a connection with a GNSS or base station, the synchronization for a UE may require sidelink synchronization with another UE that is already synchronized to a GNSS or base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes transmitting, by a user equipment (UE), a capability indication message to a network entity, the capability indication message comprising a sidelink capability for direct communication between the UE and one or more secondary UEs; receiving, at the UE, a configuration message from the network entity in response to the capability indication message, wherein the configuration message includes one or more configuration parameters based on the sidelink capability; and establishing a communication link based on the one or more configuration parameters.

In a further example, an apparatus for wireless communication is provided that includes a transceiver, a memory configured to store instructions, and one or more processors communicatively coupled with the transceiver and the memory. The aspect may include the one or more processors being configured to transmit, by a UE, a capability indication message to a network entity, the capability indication message comprising a sidelink capability for direct communication between the UE and one or more secondary UEs; receive, at the UE, a configuration message from the network entity in response to the capability indication message, wherein the configuration message includes one or more configuration parameters based on the sidelink capability; and establish a communication link based on the one or more configuration parameters.

In another aspect, an apparatus for wireless communication is provided that includes means for transmitting, by a UE, a capability indication message to a network entity, the capability indication message comprising a sidelink capability for direct communication between the UE and one or more secondary UEs; means for receiving, at the UE, a configuration message from the network entity in response to the capability indication message, wherein the configuration message includes one or more configuration parameters based on the sidelink capability; and means for establishing a communication link based on the one or more configuration parameters.

In yet another aspect, a non-transitory computer-readable medium is provided including code for transmitting, by a UE, a capability indication message to a network entity, the capability indication message comprising a sidelink capability for direct communication between the UE and one or more secondary UEs; code for receiving, at the UE, a configuration message from the network entity in response to the capability indication message, wherein the configuration message includes one or more configuration parameters based on the sidelink capability; and code for establishing a communication link based on the one or more configuration parameters.

In another example, a method for wireless communication includes receiving, by a network entity, a capability indication message from a UE, the capability indication message comprising a sidelink capability for direct communication between the UE and one or more secondary UEs; transmitting, by the network entity, a configuration message to the UE in response to the capability indication message, wherein the configuration message includes one or more configuration parameters based on the sidelink capability; and establishing a communication link based on the one or more configuration parameters.

In a further example, an apparatus for wireless communication is provided that includes a transceiver, a memory configured to store instructions, and one or more processors communicatively coupled with the transceiver and the memory. The aspect may include the one or more processors being configured to receive, by a network entity, a capability indication message from a UE, the capability indication message comprising a sidelink capability for direct communication between the UE and one or more secondary UEs; transmit, by the network entity, a configuration message to the UE in response to the capability indication message, wherein the configuration message includes one or more configuration parameters based on the sidelink capability; and establish a communication link based on the one or more configuration parameters.

In another aspect, an apparatus for wireless communication is provided that includes means for receiving, by a network entity, a capability indication message from a UE, the capability indication message comprising a sidelink capability for direct communication between the UE and one or more secondary UEs; means for transmitting, by the network entity, a configuration message to the UE in response to the capability indication message, wherein the configuration message includes one or more configuration parameters based on the sidelink capability; and means for establishing a communication link based on the one or more configuration parameters.

In yet another aspect, a non-transitory computer-readable medium is provided including code for receiving, by a network entity, a capability indication message from a UE, the capability indication message comprising a sidelink capability for direct communication between the UE and one or more secondary UEs; code for transmitting, by the network entity, a configuration message to the UE in response to the capability indication message, wherein the configuration message includes one or more configuration parameters based on the sidelink capability; and code for establishing a communication link based on the one or more configuration parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
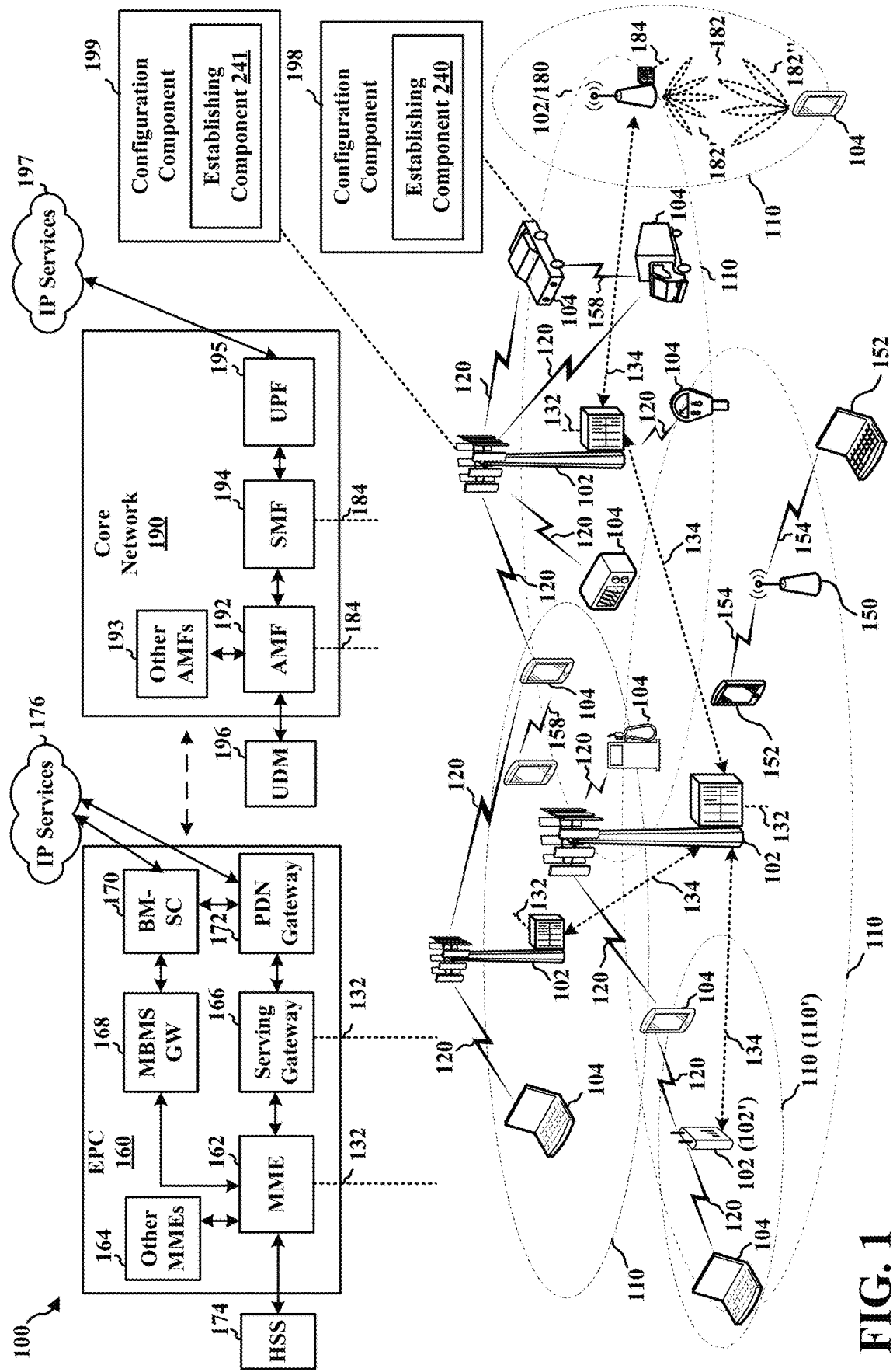
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate configuration component 198 to transmit a capability indication message to a network entity 102, where the capability indication message includes a sidelink capability for direct communication between the UE 104 and one or more secondary UEs 104. The UE 104 may receive a configuration message from the network entity 102 in response to the capability indication message, wherein the configuration message includes one or more configuration parameters based on the sidelink capability. As such, the UE 104 may establish a communication link based on the one or more configuration parameters.

Correspondingly, in certain aspects, the network entity 102 (e.g., base station) may be configured to operate configuration component 199 to receive the capability indication message from the UE 104. As noted, the capability indication message includes a sidelink capability for direct communication between the UE 104 and one or more secondary UEs 104, e.g., sidelink UEs. The network entity 102 may transmit a configuration message to the UE 104 in response to the capability indication message, wherein the configuration message includes one or more configuration parameters based on the sidelink capability. Thus, the network entity 102 may help the UE 104 to establish a communication link based on the one or more configuration parameters.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
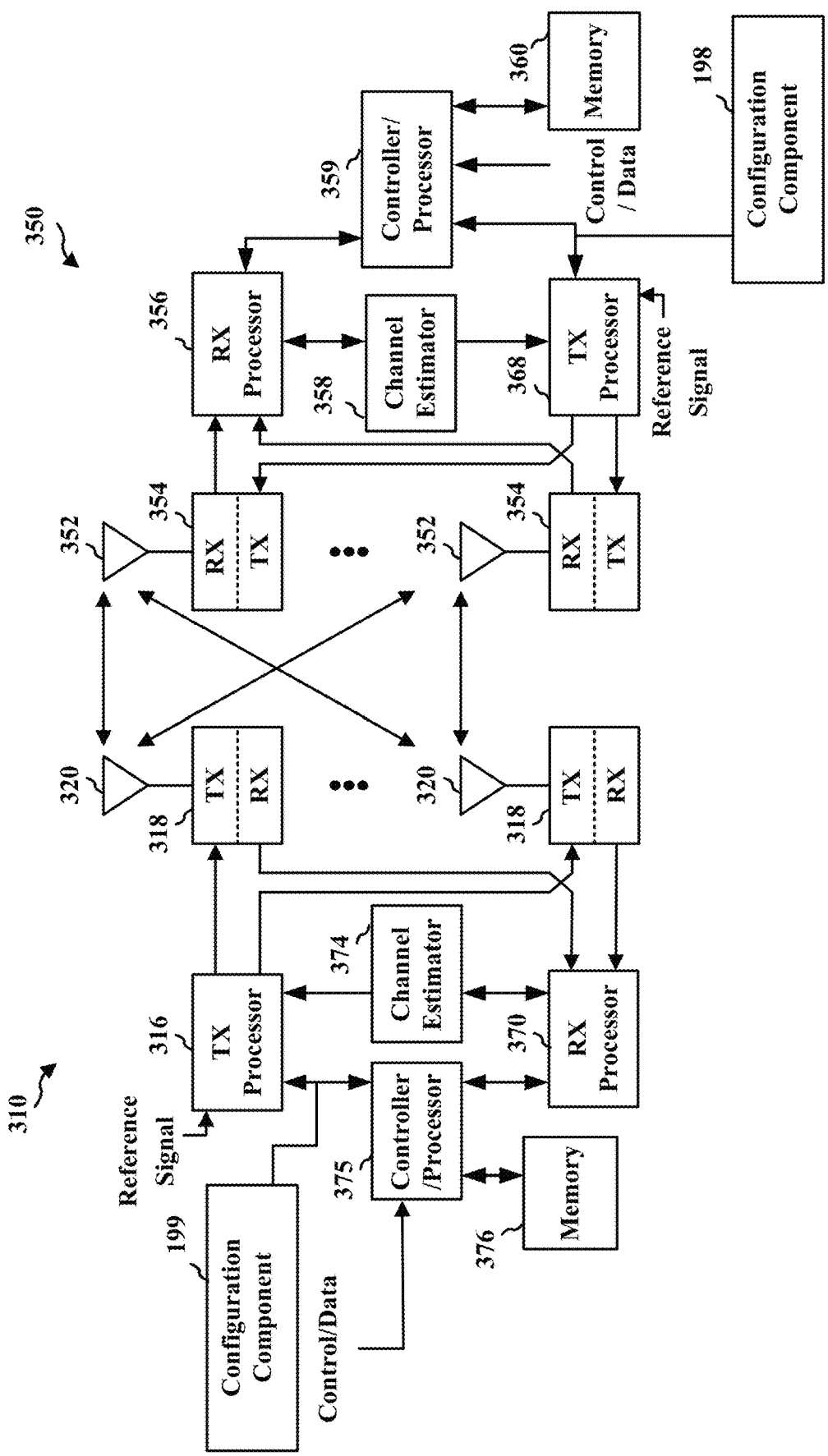
FIG. 3 is a diagram illustrating an example of a base station and user equipment (UE) in an access network.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

The described features generally relate to the communicating sidelink capability information for a UE. For example, sidelink or D2D communication may include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to a network node such as a base station), a combination thereof, and/or with other devices, which may be collectively referred to as V2X communications. Generally, support for synchronization using SSBs within synchronization signal bursts is provided in 5G NR communication technologies over the Uu interface (e.g., from a gNodeB (gNB) to a user equipment (UE)), for example, as described herein with reference to FIGS. 2A-2D. Similar synchronization as described herein with reference to FIGS. 2A-2D may also be implemented in V2X communication over a sidelink channel. For example, in V2X or other D2D communications, a UE that has received a synchronization signal from a gNB or global navigation satellite system (GNSS) may transmit a sidelink synchronization signal that is consistent with the gNB or GNSS timing and/or frequency, so that other UEs that are out of range of the gNB and/or GNSS may also be able to synchronize to such timing and/or frequency. Further, a UE that has received no synchronization signal from a gNB or GNSS may also transmit a sidelink synchronization signal to synchronize with other UEs and send data to other UEs.

For example, in an aspect, the present disclosure includes a method, apparatus, and computer readable medium for wireless communications for efficiently communicating sidelink capability information for a UE. The aspect may include transmitting, by a UE, a capability indication message to a network entity, the capability indication message comprising a sidelink capability for direct communication between the UE and one or more secondary UEs; receiving, at the UE, a configuration message from the network entity in response to the capability indication message, wherein the configuration message includes one or more configuration parameters based on the sidelink capability; and establishing a communication link based on the one or more configuration parameters.

In another example, in an aspect, the present disclosure includes a method, apparatus, and computer readable medium for wireless communications for receiving, by a network entity, a capability indication message from a UE, the capability indication message comprising a sidelink capability for direct communication between the UE and one or more secondary UEs; transmitting, by the network entity, a configuration message to the UE in response to the capability indication message, wherein the configuration message includes one or more configuration parameters based on the sidelink capability; and establishing a communication link based on the one or more configuration parameters.

Figure 4:
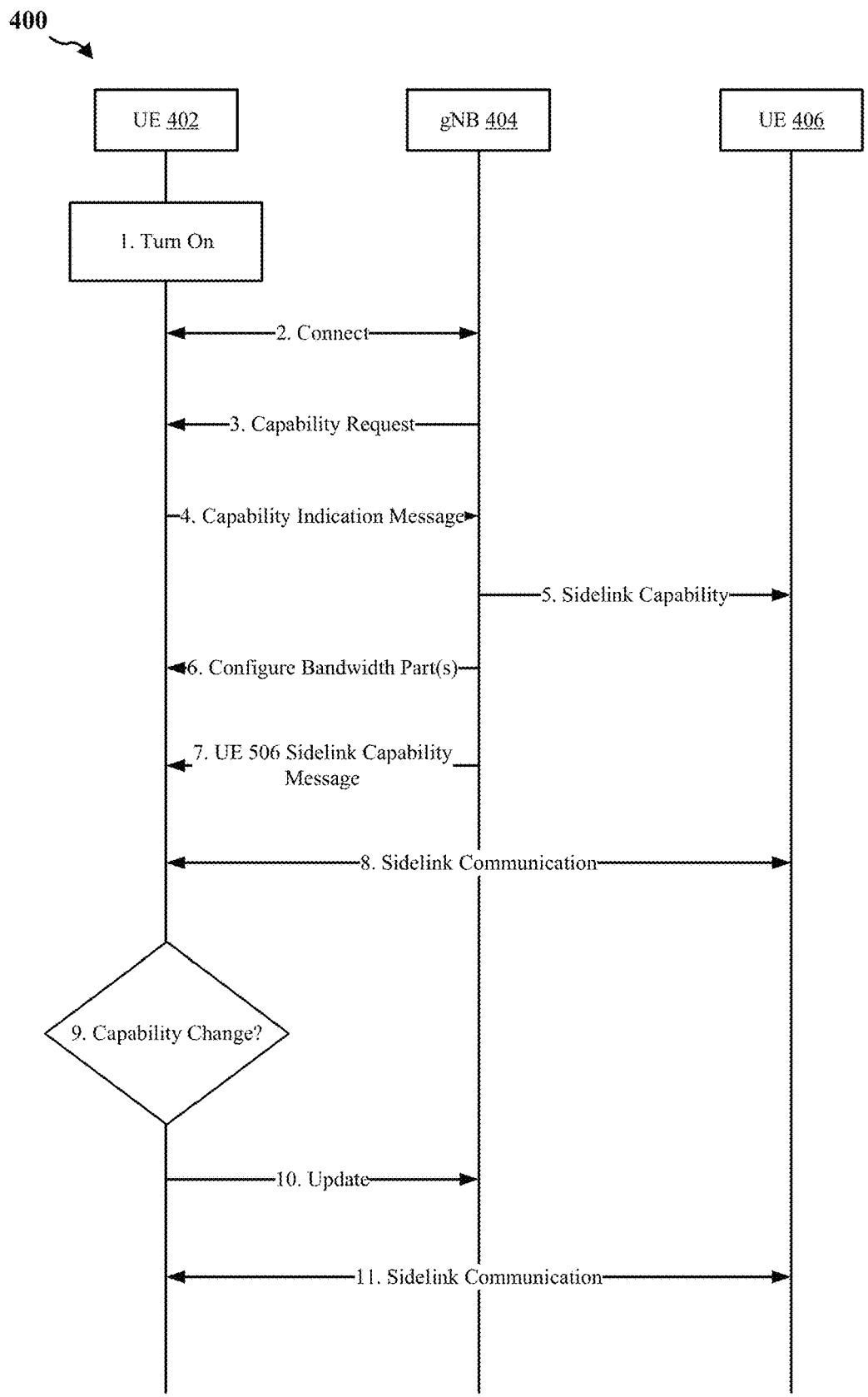
FIG. 4 is a diagram illustrating an example of communicating sidelink capability information between a UE and one or more network entities.

FIG. 4 is a diagram 400 illustrating an example of communicating sidelink capability information between UE 402, gNB 404, and UE 406. For example, UE 402 may be similar to or the same as UE 104 of FIG. 1, gNB/ng-eNB/eNB may be similar to or the same as base stations 102, and UE 406 may be similar to or the same as UE 104.

In an aspect, at step 1, UE 402 may turn on and at step 2 may connect with gNB 404. In an example, the connection may include UE 402 receiving system information block 1 (SIB1) and performing a random access procedure to establish a communication link with gNB 404. At step 3, gNB 404 may transmit a capability request to UE 402. At step 4, UE 402 may transmit a capability indication message to gNB 404 in response receiving the capability request. For example, the capability indication message comprises a sidelink capability for direct communication between UE 402 and UE 406. At step 5, gNB 404 may forward the sidelink capability associated with the capability indication message to UE 406.

At step 6, gNB 404 may configure one or more bandwidth parts (BWPs) for UE 402 to establish the sidelink communication with UE 406. At step 7, gNB 404 may transmit sidelink capability message to UE 402 that includes one or more configuration parameters based on the sidelink capability. At step 8, UE 402 and UE 406 may establish sidelink communications. At step 9, after a period of time, UE 402 may determine whether a change in its capability has occurred corresponding to the sidelink capability. If a change has occurred, at step 10, UE 402 may transmit an update message to gNB 404 to make any modifications and/or configurations that are necessary. At step 11, in response to any changes, UE 402 and UE 406 may update and continue the sidelink communication.

Figure 5:
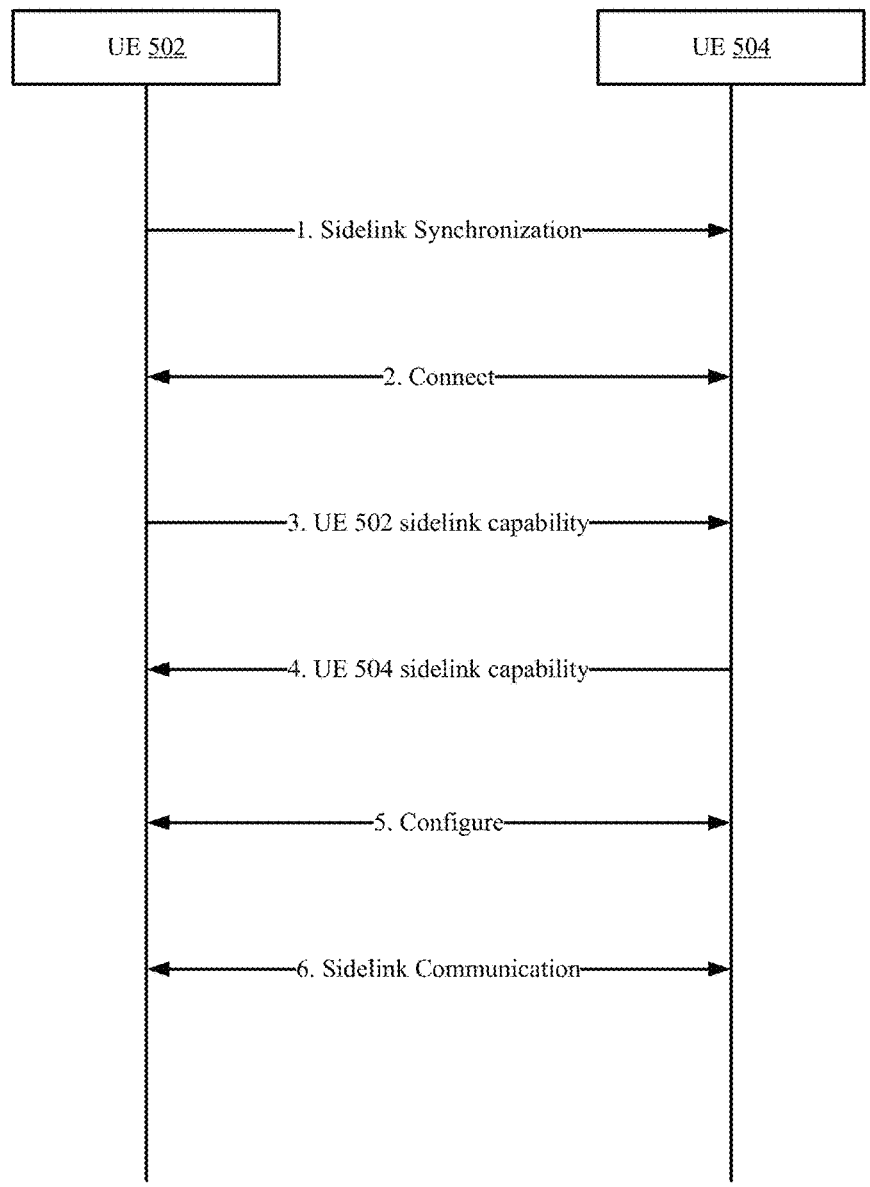
FIG. 5 is a diagram illustrating an example of at least two UEs communicating via a sidelink.

FIG. 5 is a diagram 500 illustrating an example of sidelink communications between UE 502 and UE 504. For example, UE 502 may be similar to or the same as UE 104 of FIG. 1, and UE 504 may be similar to or the same as UE 104 of FIG. 1.

At step 1, the UE 502 may transmit a sidelink synchronization signal to UE 504 to initiate a sidelink communication link. At step 2, UE 502 and UE 504 may establish a communication for establishing a sidelink. At step 3, UE 502 may transmit its sidelink capability information to UE 504. Further, the sidelink capability may also be transmitted in part or in whole as part of step 1 and/or step 2. For example, synchronization signals used between UE and gNB contain PBCH which carries MIB payload, and prior to UE initiating a connection via RACH transmission, UE also reads Remaining Minimum System Information (RMSI) in SIB1 after reading the PBCH. Similar PBCH-like or SIB1-like payload transmission could be part of the sidelink synchronization signal and/or sidelink SIB-1 transmission as well. Further some capabilities could also be exchanged as part of the step 2 procedure (equivalent to RACH procedure for UE-to-gNB connection establishment). Additionally, at step 4, UE 504 may transmit its sidelink capability information to UE 502. In response to each UE receive the other's sidelink capability, UE 502 and UE 504 may configure their respective communications at step 5. At step 6, UE 502 and UE 504 may establish a sidelink communication.

Figure 6:
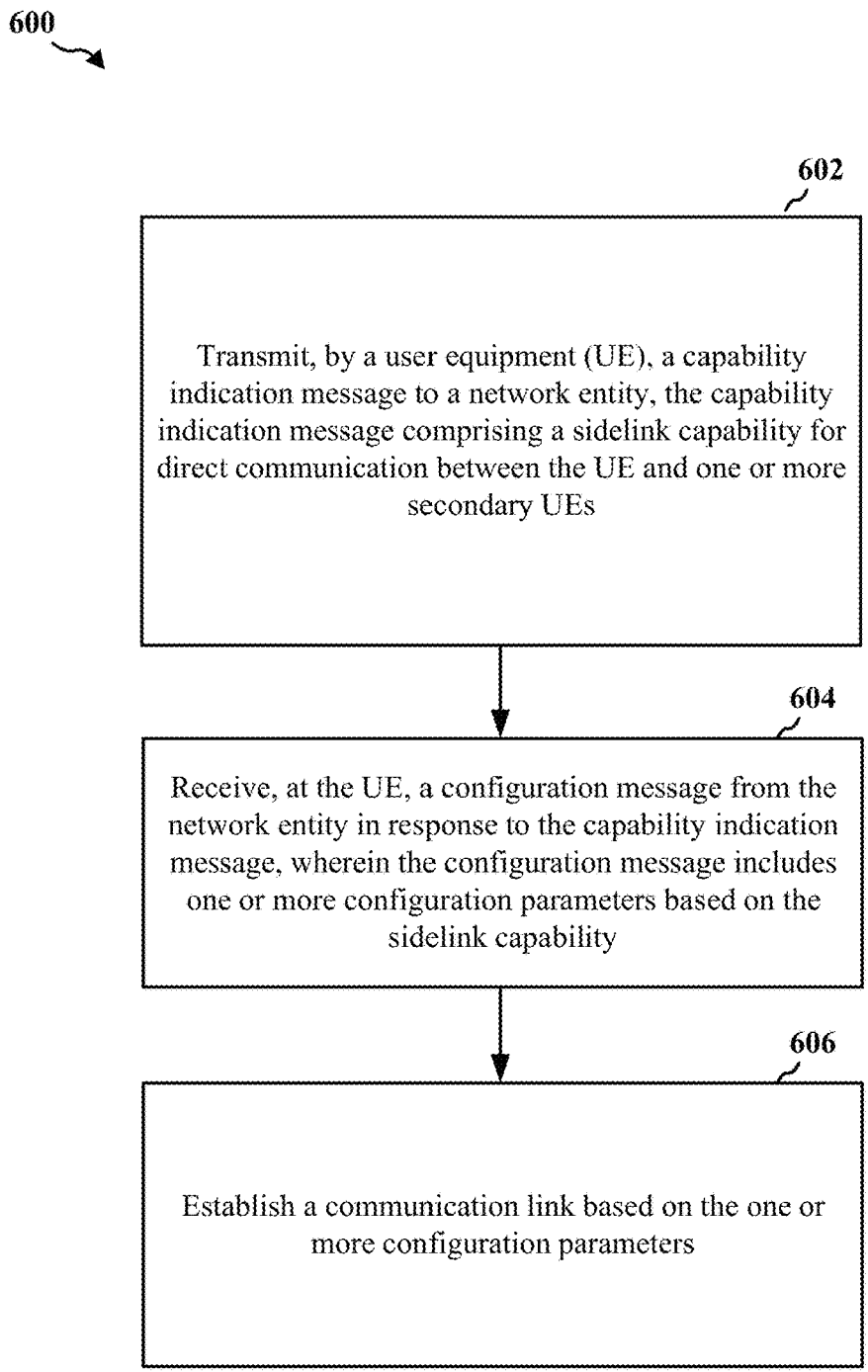
FIG. 6 is a flowchart of a method of wireless communication of a UE communicating sidelink capability information.

FIG. 6 is a flowchart 600 of a method of wireless communication. The method may be performed by a UE (e.g., the UE 104; the apparatus 350; the controller/processor 359, which may include the memory 360, processor(s) 812, which may include the memory 816, modem 840 and which may be the entire UE 104 or a component of the UE 104, such as the TX processor 368, the RX processor 356, and/or the transceiver 802).

At 602, method 600 includes transmitting, by a user equipment (UE), a capability indication message to a network entity, the capability indication message comprising a sidelink capability for direct communication between the UE and one or more secondary UEs. In an aspect, the UE 104 and/or the configuration component 198, e.g., in conjunction with controller/processor 359, which may include the memory 360, processor(s) 812, which may include the memory 816, modem 840, TX processor 368, and transceiver 802 may transmit a capability indication message to a network entity, the capability indication message comprising a sidelink capability for direct communication between the UE and one or more secondary UEs. As such, the UE 104 and/or the configuration component 198, e.g., in conjunction with controller/processor 359, which may include the memory 360, processor(s) 812, which may include the memory 816, modem 840, TX processor 368, and transceiver 802 may define a means for transmitting a capability indication message to a network entity 102, the capability indication message comprising a sidelink capability for direct communication between the UE 104 and one or more secondary UEs 104.

At 604, method 600 includes receiving, at the UE, a configuration message from the network entity in response to the capability indication message, wherein the configuration message includes one or more configuration parameters based on the sidelink capability. In an aspect, the UE 104 and/or the configuration component 198, e.g., in conjunction with controller/processor 359, which may include the memory 360, processor(s) 812, which may include the memory 816, modem 840, RX processor 356, and transceiver 802 may receive a configuration message from the network entity 102 in response to the capability indication message, wherein the configuration message includes one or more configuration parameters based on the sidelink capability. As such, configuration component 198, e.g., in conjunction with controller/processor 359, which may include the memory 360, processor(s) 812, which may include the memory 816, modem 840, RX processor 356, and transceiver 802 may define a means for receiving a configuration message from the network entity 102 in response to the capability indication message, wherein the configuration message includes one or more configuration parameters based on the sidelink capability.

At 606, method 600 includes establishing a communication link based on the one or more configuration parameters. In an aspect, the UE 104 and/or the configuration component 198, e.g., in conjunction with controller/processor 359, which may include the memory 360, processor(s) 812, which may include the memory 816, modem 840, and establishing component 240 may establish a communication link based on the one or more configuration parameters. As such, configuration component 198, e.g., in conjunction with controller/processor 359, which may include the memory 360, processor(s) 812, which may include the memory 816, modem 840, and establishing component 240 may define a means for establishing a communication link based on the one or more configuration parameters.

In an example, method 600 may include determining a capability value associated with the configuration message, the capability value indicating one or more enabled configurations corresponding to the sidelink capability, wherein establishing the communication link is further based on the one or more enabled configurations.

In another example, transmitting the capability indication message comprising the sidelink capability comprises transmitting a sidelink duplexing mode capability. Further, establishing the communication link between the UE and the one or more secondary devices further comprises operating, by the UE, in a duplexing mode corresponding to the sidelink duplexing mode capability.

In an example, transmitting the sidelink duplexing mode capability comprises transmitting one or any combination of: a half duplex mode capability of communication between an access link with the network entity and a sidelink with a respective secondary UE; a transmit multiplex mode capability of being able to transmit to one or more network entities using one or more access links while concurrently being able to transmit to one or multiple ones of the secondary UEs using a respective sidelink or respective multiple sidelinks; a receive multiplex mode capability of being able to receive from the one or more network entities using the one or more access links while concurrently being able to receive from one or the multiple ones of the secondary UEs using the respective sidelink or the respective multiple sidelinks; a transmit full-duplex mode capability of being able to transmit to a first node while concurrently being able to receive from a second node; a receive full-duplex mode capability of being able to receive from the first node while concurrently being able to transmit from a second node; a full duplex mode capability of being able to receive on one or more access links and/or sidelinks concurrently with transmitting on one or more access links and/or sidelinks.

In an example, each of the transmit multiplex mode capability, the receive multiplex mode capability, the transmit full-duplex mode capability, and the receive full-duplex mode capability correspond to at least one of a spatial division multiplexing (SDM), frequency division multiplexing (FDM), or a combination thereof.

In an example, each of the first node and the second node correspond to at least one of a UE, network entity, or combination thereof.

In an example, the first node is the same as the second node or the first node differs from the second node.

In an example, transmitting the capability indication message comprising the sidelink capability comprises transmitting a number of antenna panels, wherein a sidelink duplexing mode capability corresponds to the number of antenna panels. For example, transmitting the capability indication message comprising the sidelink capability comprises transmitting a first capability indication message comprising a first sidelink capability, and further comprising: determining a change in capability from the first sidelink capability subsequent to establishing the communication link; and transmitting a second capability indication message comprising a second sidelink capability comprising a second sidelink capability, based on determining the change in capability, subsequent to transmitting the first capability indication message, wherein the second sidelink capability is different from a first sidelink capability. Further, the first sidelink capability may use a first bandwidth part, and wherein the second sidelink capability may use a second bandwidth part different from the first bandwidth part.

In an example, receiving the configuration message comprises receiving first bandwidth part identification associated with use of a first sidelink capability and a second bandwidth part identification associated with use of a second sidelink capability, wherein the first bandwidth part identification corresponds to a first bandwidth part that is different from the second bandwidth part identification that corresponds to a second bandwidth part, and wherein establishing the communication link comprises: communicating using the first bandwidth part based on the first sidelink capability; and communicating using the second bandwidth part based on the second sidelink capability.

In an example, transmitting the capability indication message comprising the sidelink capability comprises transmitting a half duplex mode capability, and wherein establishing the communication link further comprises operating, by the UE, in a half duplex mode between an access link with a network entity and a sidelink with a respective secondary UE.

In an example, transmitting the capability indication message comprising the sidelink capability comprises transmitting a transmit multiplex mode capability, and wherein establishing the communication link further comprises operating, by the UE, in a transmit multiplex mode for transmitting to one or more network entities using one or more access links while concurrently being able to transmit to one or multiple ones of the secondary UEs using a respective sidelink or respective multiple sidelinks.

In an example, transmitting the capability indication message comprising the sidelink capability comprises transmitting a receive multiplex mode capability, and wherein establishing the communication link further comprises operating, by the UE, in a receive multiplex mode for receiving from one or more network entities using one or more access links while concurrently being able to receive from one or multiple ones of the secondary UEs using a respective sidelink or respective multiple sidelinks.

In an example, transmitting the capability indication message comprising the sidelink capability comprises transmitting a transmit full-duplex mode capability, and wherein establishing the communication link further comprises transmitting, by the UE, to one or more network entities using one or more access link while concurrently being able to receive from one or multiple ones of secondary UEs using a respective sidelink or respective multiple sidelinks.

In an example, transmitting the capability indication message comprising the sidelink capability comprises transmitting a receive full-duplex mode capability, and wherein establishing the communication link further comprises receiving, by the UE, from one or more network entities using one or more access links while concurrently being able to transmit to one or the multiple ones of secondary UEs using a respective sidelink or respective multiple sidelinks.

In an example, transmitting the capability indication message to the network entity further comprises transmitting to a base station via an access link between the UE and the base station, wherein the base station is configured to operate as a negotiating entity of sidelink connections by relaying at least a subset of the capability indication message to the one or more secondary UEs.

In an example, transmitting the capability indication message to the network entity further comprises transmitting to the one or more secondary UEs via a sidelink between the UE and the one or more secondary UEs.

In an example, transmitting the capability indication message further comprises transmitting in at least one of a Radio Resource Control (RRC) message, media access control (MAC) control element (CE), downlink control information (DCI), sidelink control information (SCI), or combination thereof.

In an example, the network entity corresponds to at least one of a base station or a sidelink UE.

Figure 7:
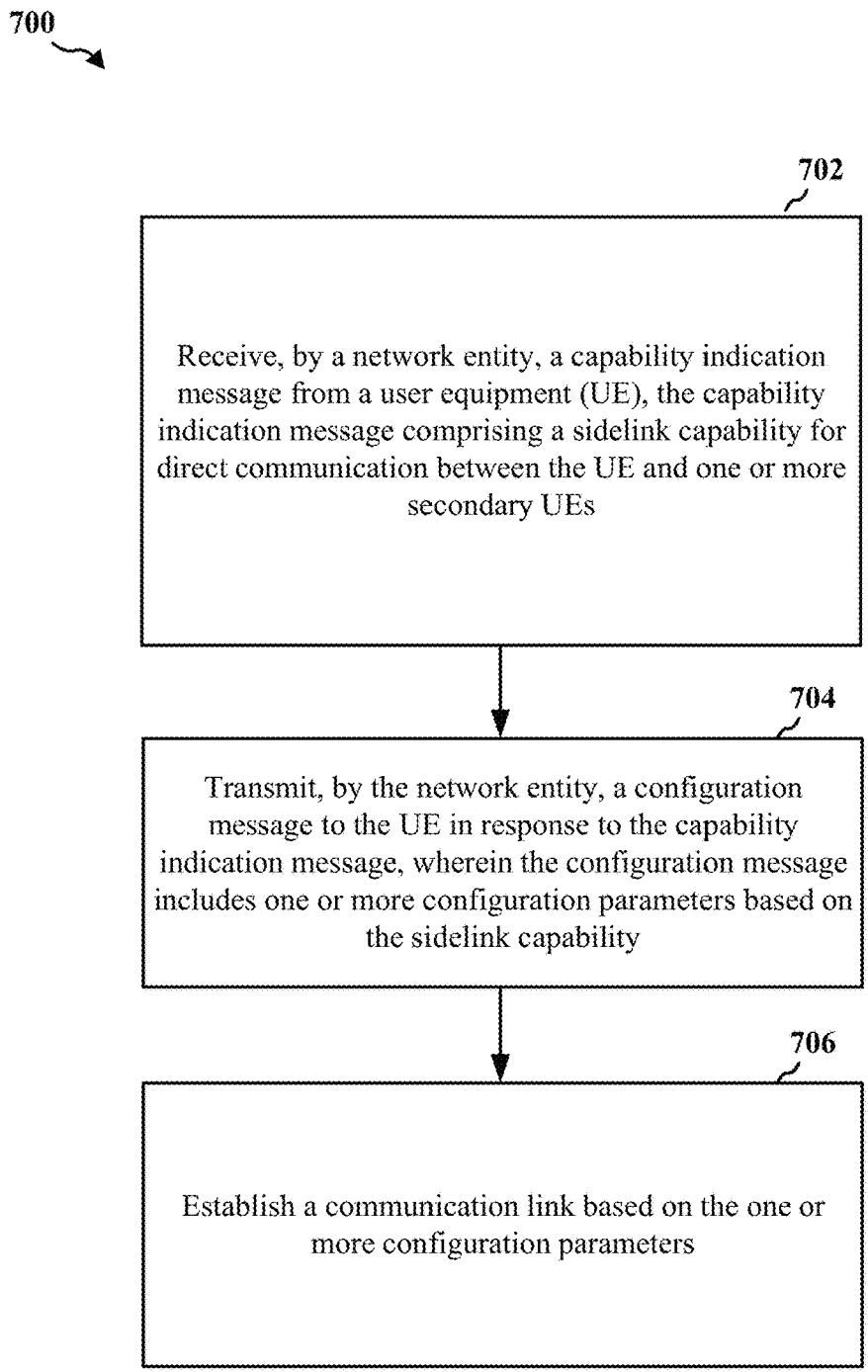
FIG. 7 is a flowchart of a method of wireless communication of a network entity communicating sidelink capability information.

FIG. 7 is a flowchart 700 of a method of wireless communication. The method may be performed by a network entity (e.g., the network entity 102; the controller/processor 375, which may include the memory 376, processor(s) 912, which may include the memory 916, modem 940 and which may be the entire network entity 102 or a component of the network entity 102, such as the TX processor 316, the RX processor 370, and/or the transceiver 902).

At 702, method 700 includes receiving, by a network entity, a capability indication message from a user equipment (UE), the capability indication message comprising a sidelink capability for direct communication between the UE and one or more secondary UEs. In an aspect, the network entity 102 and/or the configuration component 199, e.g., in conjunction with processor(s) 375/912, memory(s) 376/916, the RX processor 370, and/or the transceiver 902 may receive a capability indication message from a UE 104, the capability indication message comprising a sidelink capability for direct communication between the UE 104 and one or more secondary UEs 104.

At 704, method 700 includes transmitting, by the network entity, a configuration message to the UE in response to the capability indication message, wherein the configuration message includes one or more configuration parameters based on the sidelink capability. In an aspect, the network entity 102 and/or the configuration component 199, e.g., in conjunction with processor(s) 375/912, memory(s) 376/916, the TX processor 316, and/or the transceiver 902 may transmit a configuration message to the UE 104 in response to the capability indication message, wherein the configuration message includes one or more configuration parameters based on the sidelink capability.

At 706, method 700 includes establishing a communication link based on the one or more configuration parameters. In an aspect, the network entity 102 and/or the configuration component 199, e.g., in conjunction with processor(s) 375/912, memory(s) 376/916, establishing component 241 may establish a communication link based on the one or more configuration parameters.

In an example, receiving the capability indication message comprising the sidelink capability comprises receiving a sidelink duplexing mode capability. Further, establishing the communication link further comprises operating, by the network entity, in a duplexing mode corresponding to the sidelink duplexing mode capability.

In an example, receiving the sidelink duplexing mode capability comprises receiving one or any combination of: a half duplex mode capability of communication between an access link with the network entity and a sidelink with a respective secondary UE; a transmit multiplex mode capability of being able to transmit to one or more network entities using one or more access links while concurrently being able to transmit to one or multiple ones of the secondary UEs using a respective sidelink or respective multiple sidelinks; a receive multiplex mode capability of being able to receive from the one or more network entities using the one or more access links while concurrently being able to receive from the one or the multiple ones of the secondary UEs using the respective sidelink or the respective multiple sidelinks; a transmit full-duplex mode capability of being able to transmit to a first node while concurrently being able to receive from a second node; a receive full-duplex mode capability of being able to receive from the first node while concurrently being able to transmit to the second node.

In an example, each of the transmit multiplex mode capability, the receive multiplex mode capability, the transmit full-duplex mode capability, and the receive full-duplex mode capability correspond to at least one of a spatial division multiplexing (SDM), frequency division multiplexing (FDM), or a combination thereof.

In an example, each of the first node and the second node correspond to at least one of a UE, network entity, or combination thereof.

In an example, the first node is the same as the second node or the first node differs from the second node.

In an example, receiving the capability indication message comprising the sidelink capability comprises receiving a number of antenna panels, wherein a sidelink duplexing mode capability corresponds to the number of antenna panels.

In an example, receiving the capability indication message comprising the sidelink capability comprises receiving a first capability indication message comprising a first sidelink capability, and further comprising: receiving a second capability indication message comprising a second sidelink capability subsequent to receiving the first capability indication message, wherein the second sidelink capability is different from a first sidelink capability.

In an example, the first sidelink capability uses a first bandwidth part, and wherein the second sidelink capability uses a second bandwidth part different from the first bandwidth part.

In an example, receiving the capability indication message further comprises receiving the capability message from the UE via an access link providing a communication link between the UE and the network entity.

In an example, method 700 may include transmitting, by the network entity, the capability indication message to the one or more secondary UEs using a respective sidelink or respective multiple sidelinks.

In an example, method 700 may include receiving the capability indication message further comprises receiving in at least one of an RRC message, MAC CE, DCI, SCI, or combination thereof.

Figure 8:
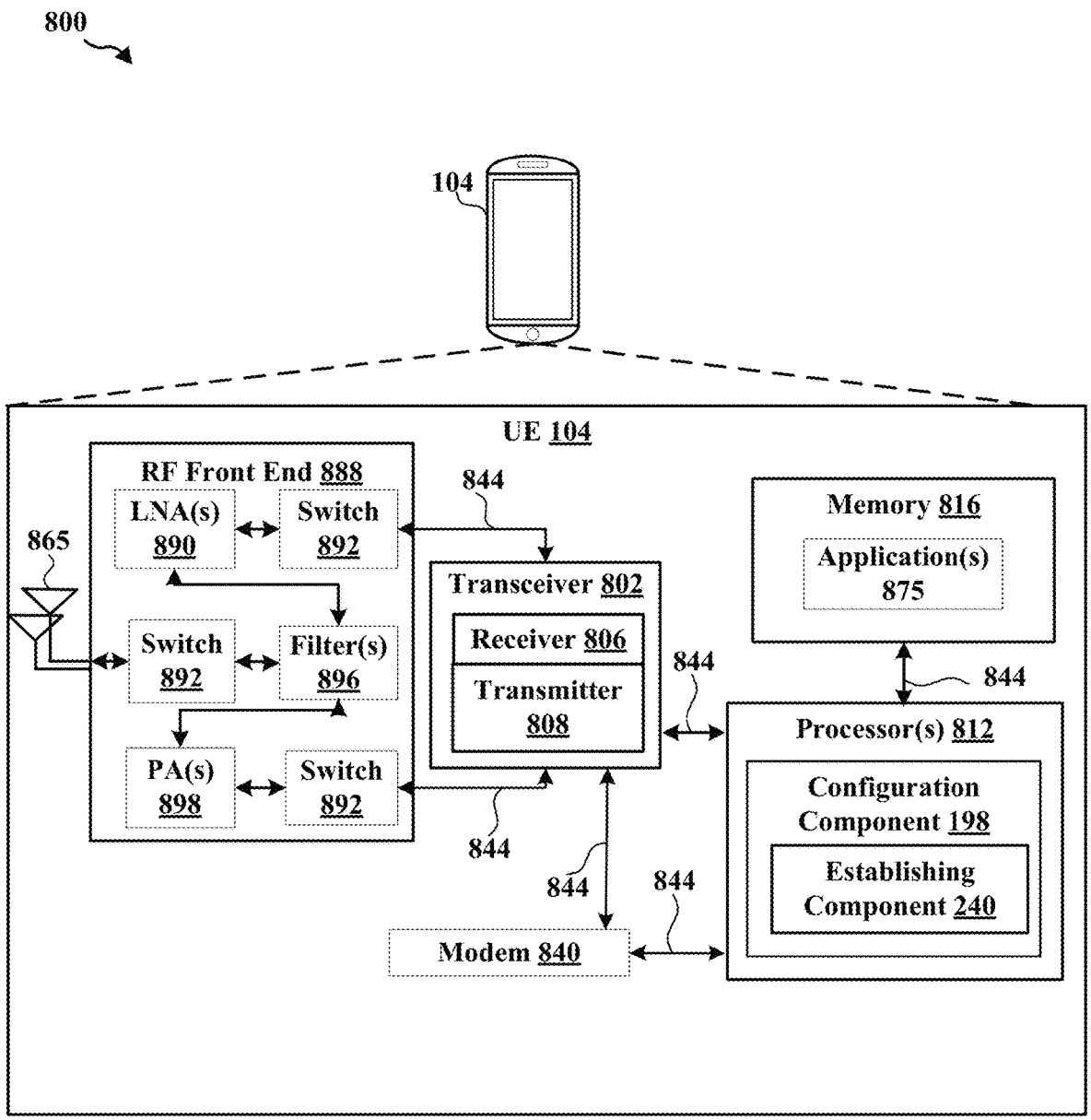
FIG. 8 is a block diagram illustrating an example of a UE, in accordance with various aspects of the present disclosure.

Referring to FIG. 8, one example of an implementation of UE 104 may include a variety of components, some of which have already been described above and are described further herein, including components such as one or more processors 812 and memory 816 and transceiver 802 in communication via one or more buses 844, which may operate in conjunction with modem 840 and/or configuration component 198 for communicating sidelink capability information.

In an aspect, the one or more processors 812 can include a modem 840 and/or can be part of the modem 840 that uses one or more modem processors. Thus, the various functions related to configuration component 198 may be included in modem 840 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 840 associated with configuration component 198 may be performed by transceiver 802.

Also, memory 816 may be configured to store data used herein and/or local versions of applications 875 or communicating component 842 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining configuration component 198 and/or one or more of its subcomponents, and/or data associated therewith, when UE 104 is operating at least one processor 812 to execute configuration component 198 and/or one or more of its subcomponents.

Transceiver 802 may include at least one receiver 806 and at least one transmitter 808. Receiver 806 may include hardware and/or software executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, signal-to-noise ratio (SNR), reference signal received power (RSRP), received signal strength indicator (RSSI), etc. Transmitter 808 may include hardware and/or software executable by a processor for transmitting data, the code comprising instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 104 can communicate with, for example, one or more base stations 102 or one or more cells associated with one or more base stations 102. In an aspect, for example, modem 840 can configure transceiver 802 to operate at a specified frequency and power level based on the UE configuration of the UE 104 and the communication protocol used by modem 840.

In an aspect, modem 840 can be a multiband-multimode modem, which can process digital data and communicate with transceiver 802 such that the digital data is sent and received using transceiver 802. In an aspect, modem 840 can be multiband and be configured to support multiple frequency bands for a specific communications protocol. In an aspect, modem 840 can be multimode and be configured to support multiple operating networks and communications protocols. In an aspect, modem 840 can control one or more components of UE 104 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 842 can optionally include mode determining component 852. For example, upon receiving an anchor signal in an initial bandwidth portion from a network entity 102, the anchor signal triggering an initial access procedure for the UE 104, mode determining component 852 may determine whether to operate in a wideband OFDM mode or a wideband SC-FDM mode in response to receiving the anchor signal. Communicating component 842 may then transmit a capability report message to the network entity 102 based on the determination by the mode determining component 852 of whether to operate in the wideband OFDM mode or the wideband SC-FDM mode In an aspect, the processor(s) 812 may correspond to one or more of the processors described in connection with the UE in FIG. 3. Similarly, the memory 816 may correspond to the memory described in connection with the UE in FIG. 3.

Figure 9:
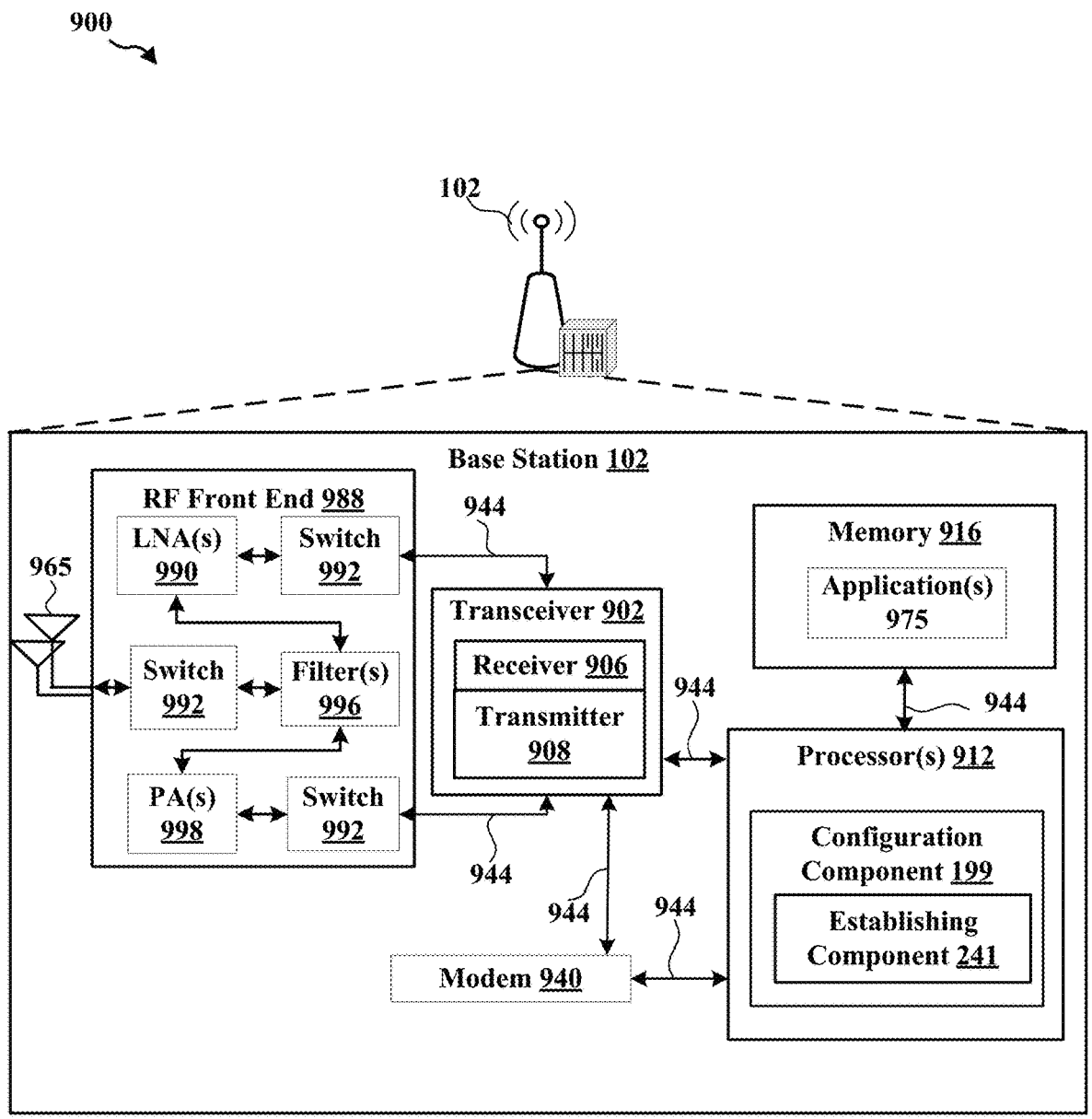
FIG. 9 is a block diagram illustrating an example of a base station, in accordance with various aspects of the present disclosure.

Referring to FIG. 9, one example of an implementation of base station 102 (e.g., a base station 102, as described above) may include a variety of components, some of which have already been described above, but including components such as one or more processors 912 and memory 916 and transceiver 902 in communication via one or more buses 944, which may operate in conjunction with modem 940 and configuration component 199 for communicating sidelink capability information.

The transceiver 902, receiver 906, transmitter 908, one or more processors 912, memory 916, applications 975, buses 944, RF front end 988, LNAs 990, switches 992, filters 996, PAs 998, and one or more antennas 965 may be the same as or similar to the corresponding components of UE 104, as described above, but configured or otherwise programmed for base station operations as opposed to UE operations.

In an aspect, the processor(s) 912 may correspond to one or more of the processors described in connection with the base station in FIG. 3. Similarly, the memory 916 may correspond to the memory described in connection with the base station in FIG. 3.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    transmitting a capability indication message to a network entity, the capability indication message comprising a first sidelink capability for direct communication between the UE and one or more secondary UEs;
    receiving a configuration message from the network entity in response to the capability indication message, wherein the configuration message includes one or more configuration parameters of one or more bandwidth parts (BWPs) based on the first sidelink capability for sidelink communications between the UE and the one or more secondary UEs;
    establishing a communication link based on the one or more configuration parameters received in response to the configuration message;
    determining a change in capability from the first sidelink capability to a second sidelink capability subsequent to establishing the communication link, wherein the second sidelink capability is different from the first sidelink capability;
    transmitting the second sidelink capability to the network entity or the one or more secondary UEs subsequent to determining the change in capability; and
    continuing communications on the communication link based on the second sidelink capability subsequent to transmitting the second sidelink capability to the network entity or the one or more secondary UEs.

2. The method of claim 1, further comprising determining a capability value associated with the configuration message, the capability value indicating one or more enabled configurations corresponding to the first sidelink capability, wherein establishing the communication link is further based on the one or more enabled configurations.

3. The method of claim 1, wherein transmitting the capability indication message comprising the first sidelink capability comprises transmitting a sidelink duplexing mode capability;
    wherein establishing the communication link between the UE and the one or more secondary UEs further comprises operating, by the UE, in a duplexing mode corresponding to the first sidelink duplexing mode capability.

4. The method of claim 3, wherein transmitting the sidelink duplexing mode capability comprises transmitting one or any combination of:

a half duplex mode capability of communication between an access link with the network entity and a sidelink with a respective secondary UE;

a transmit multiplex mode capability of being able to transmit to one or more network entities using one or more access links while concurrently being able to transmit to one or multiple ones of the one or more secondary UEs using a respective sidelink or respective multiple sidelinks;

a receive multiplex mode capability of being able to receive from the one or more network entities using the one or more access links while concurrently being able to receive from the one or the multiple ones of the one or more secondary UEs using the respective sidelink or the respective multiple sidelinks;

a transmit full-duplex mode capability of being able to transmit to a first node while concurrently being able to receive from a second node; and a receive full-duplex mode capability of being able to receive from the first node while concurrently being able to transmit to the second node.

5. The method of claim 4, wherein each of the transmit multiplex mode capability, the receive multiplex mode capability, the transmit full-duplex mode capability, and the receive full-duplex mode capability correspond to at least one of a spatial division multiplexing (SDM), frequency division multiplexing (FDM), or a combination thereof.

6. The method of claim 4, wherein each of the first node and the second node correspond to at least one of a UE, network entity, or combination thereof.

7. The method of claim 4, wherein the first node is the same as the second node.

8. The method of claim 4, wherein the first node differs from the second node.

9. The method of claim 1, wherein transmitting the capability indication message comprising the first sidelink capability comprises transmitting a number of antenna panels, wherein a sidelink duplexing mode capability corresponds to the number of antenna panels.

10. The method of claim 1, wherein the first sidelink capability uses a first bandwidth part, and wherein the second sidelink capability uses a second bandwidth part different from the first bandwidth part.

11. The method of claim 1, wherein receiving the configuration message comprises receiving a first bandwidth part identification associated with use of the first sidelink capability and a second bandwidth part identification associated with use of a second sidelink capability, wherein the first bandwidth part identification corresponds to a first bandwidth part that is different from the second bandwidth part identification that corresponds to a second bandwidth part; and wherein establishing the communication link comprises:
communicating using the first bandwidth part based on the first sidelink capability; and
communicating using the second bandwidth part based on the second sidelink capability.

12. The method of claim 1, wherein transmitting the capability indication message comprising the first sidelink capability comprises transmitting a half duplex mode capability, and wherein establishing the communication link further comprises operating, by the UE, in a half duplex mode between an access link with a network entity and a sidelink with a respective secondary UE.

13. The method of claim 1, wherein transmitting the capability indication message comprising the first sidelink capability comprises transmitting a transmit multiplex mode capability, and wherein establishing the communication link further comprises operating, by the UE, in a transmit multiplex mode for transmitting to one or more network entities using one or more access links while concurrently being able to transmit to one or multiple ones of the secondary UEs using a respective sidelink or respective multiple sidelinks.

14. The method of claim 1, wherein transmitting the capability indication message comprising the first sidelink capability comprises transmitting a receive multiplex mode capability, and wherein establishing the communication link further comprises operating, by the UE, in a receive multiplex mode for receiving from one or more network entities using one or more access links while concurrently being able to receive from one or multiple ones of the secondary UEs using a respective sidelink or respective multiple sidelinks.

15. The method of claim 1, wherein transmitting the capability indication message comprising the first sidelink capability comprises transmitting a transmit full-duplex mode capability, and wherein establishing the communication link further comprises transmitting, by the UE, to one or more network entities using one or more access link while concurrently being able to receive from one or multiple ones of secondary UEs using a respective sidelink or respective multiple sidelinks.

16. The method of claim 1, wherein transmitting the capability indication message comprising the first sidelink capability comprises transmitting a receive full-duplex mode capability, and wherein establishing the communication link further comprises receiving, by the UE, from one or more network entities using one or more access links while concurrently being able to transmit to the one or the multiple ones of the one or more secondary UEs using a respective sidelink or respective multiple sidelinks.

17. The method of claim 1, wherein transmitting the capability indication message to the network entity further comprises transmitting to a base station via an access link between the UE and the base station, wherein the base station is configured to operate as a negotiating entity of sidelink connections by relaying at least a subset of the capability indication message to the one or more secondary UEs.

18. The method of claim 1, wherein transmitting the capability indication message to the network entity further comprises transmitting to the one or more secondary UEs via a sidelink between the UE and the one or more secondary UEs.

19. The method of claim 1, wherein transmitting the capability indication message further comprises transmitting in at least one of a Radio Resource Control (RRC) message, media access control (MAC) control element (CE), downlink control information (DCI), sidelink control information (SCI), or combination thereof.

20. The method of claim 1, wherein the network entity corresponds to a base station or a sidelink UE.

21. The method of claim 1, wherein the first sidelink capability is associated with a first bandwidth part, and wherein the second sidelink capability is associated with a second bandwidth part different from the first bandwidth part.

22. The method of claim 1, further comprising transmitting a second capability indication message to the network entity comprising the second sidelink capability based on determining the change in capability from the first sidelink capability.

23. An apparatus for wireless communication at a user equipment(UE), comprising:
   a transceiver;
   a memory configured to store instructions; and
   one or more processors coupled with the transceiver and the memory, wherein the one or more processors are configured to execute the instructions to:
      transmit a capability indication message to a network entity, the capability indication message comprising a first sidelink capability for direct communication between the UE and one or more secondary UEs;
      receive a configuration message from the network entity in response to the capability indication message, wherein the configuration message includes one or more configuration parameters of one or more bandwidth parts (BWPs) based on the first sidelink capability for sidelink communications between the UE and the one or more secondary UEs;
      establish a communication link based on the one or more configuration parameters received in response to the configuration message;
      determine a change in capability from the first sidelink capability to a second sidelink capability subsequent to establishing the communication link, wherein the second sidelink capability is different from the first sidelink capability;
      transmitting the second sidelink capability to the network entity or the one or more secondary UEs subsequent to determining the change in capability; and
      continuing communications on the communication link based on the second sidelink capability subsequent to transmitting the second sidelink capability to the network entity or the one or more secondary UEs.

24. A method of wireless communication at a network entity, comprising:
   receiving a capability indication message from a user equipment (UE), the capability indication message comprising a first sidelink capability for direct communication between the UE and one or more secondary UEs;
   transmitting a configuration message to the UE in response to the capability indication message, wherein the configuration message includes one or more configuration parameters of one or more bandwidth parts (BWPs) based on the first sidelink capability for sidelink communications between the UE and the one or more secondary UEs;
   establishing a communication link based on the one or more configuration parameters in response to transmitting the configuration message;
   determining a change in capability from the first sidelink capability to a second sidelink capability subsequent to establishing the communication link, wherein the second sidelink capability is different from the first sidelink capability; and
   receiving the second sidelink capability from the UE subsequent to determining the change in capability.

25. The method of claim 24, wherein receiving the capability indication message comprising the first sidelink capability comprises receiving a sidelink duplexing mode capability;
   wherein establishing the communication link further comprises operating, by the network entity, in a duplexing mode corresponding to the sidelink duplexing mode capability.

26. The method of claim 25, wherein receiving the sidelink duplexing mode capability comprises receiving one or any combination of:
   a half duplex mode capability of communication between an access link with the network entity and a sidelink with a respective secondary UE;
   a transmit multiplex mode capability of being able to transmit to one or more network entities using one or more access links while concurrently being able to transmit to one or multiple ones of the secondary UEs using a respective sidelink or respective multiple sidelinks;
   a receive multiplex mode capability of being able to receive from the one or more network entities using the one or more access links while concurrently being able to receive from the one or the multiple ones of the secondary UEs using the respective sidelink or the respective multiple sidelinks;
   a transmit full-duplex mode capability of being able to transmit to a first node while concurrently being able to receive from a second node; and
   a receive full-duplex mode capability of being able to receive from the first node while concurrently being able to transmit to the second node.

27. The method of claim 24, wherein receiving the capability indication message comprising the first sidelink capability comprises receiving a number of antenna panels, wherein a sidelink duplexing mode capability corresponds to the number of antenna panels.

28. The method of claim 24, further comprising transmitting, by the network entity, the capability indication message to the one or more secondary UEs using a respective sidelink or respective multiple sidelinks.

29. The method of claim 24, wherein receiving the capability indication message further comprises receiving in an Radio Resource Control (RRC) message.

30. An apparatus for wireless communication at a network entity, comprising:
   a transceiver;
   a memory configured to store instructions; and
   one or more processors coupled with the transceiver and the memory, wherein the one or more processors are configured to execute the instructions to:
      receive a capability indication message from a user equipment (UE), the capability indication message comprising a first sidelink capability for direct communication between the UE and one or more secondary UEs;
      transmit a configuration message to the UE in response to the capability indication message, wherein the configuration message includes one or more configuration parameters of one or more bandwidth parts (BWPs) based on the first sidelink capability for sidelink communications between the UE and the one or more secondary UEs;
      establish a communication link based on the one or more configuration parameters in response to transmitting the configuration message;

determine a change in capability from the first sidelink capability to a second sidelink capability subsequent to establishing the communication link, wherein the second sidelink capability is different from the first sidelink capability; and
receiving the second sidelink capability from the UE subsequent to determining the change in capability.

* * * * *